United States Patent
Hsueh

(10) Patent No.: US 7,738,325 B2
(45) Date of Patent: Jun. 15, 2010

(54) READING AND WRITING METHODS AND APPARATUS FOR BLU-RAYS DISCS

(75) Inventor: Ching-Wen Hsueh, Yilan County (TW)

(73) Assignee: Mediatek Inc., Hsin-Chu (TW)

( * ) Notice: Subject to any disclaimer, the term of this patent is extended or adjusted under 35 U.S.C. 154(b) by 962 days.

(21) Appl. No.: 11/464,850

(22) Filed: Aug. 16, 2006

(65) Prior Publication Data

US 2007/0150650 A1 Jun. 28, 2007

Related U.S. Application Data

(60) Provisional application No. 60/754,142, filed on Dec. 27, 2005.

(51) Int. Cl.
*G11B 7/085* (2006.01)
*G11B 20/20* (2006.01)
*G11B 27/10* (2006.01)
*G11B 20/10* (2006.01)

(52) U.S. Cl. .............. 369/30.23; 369/47.33; 369/47.34; 369/47.1

(58) Field of Classification Search ........................ None
See application file for complete search history.

(56) References Cited

U.S. PATENT DOCUMENTS

| 5,151,905 | A * | 9/1992 | Yokono et al. ............... 714/762 |
| 2004/0246854 | A1 * | 12/2004 | Kim et al. ................. 369/53.21 |
| 2005/0229081 | A1 * | 10/2005 | Lin et al. ..................... 714/769 |
| 2006/0195758 | A1 * | 8/2006 | Blum et al. .................. 714/758 |
| 2007/0094573 | A1 * | 4/2007 | Chen et al. ................... 714/769 |

\* cited by examiner

*Primary Examiner*—Wayne R Young
*Assistant Examiner*—Carl Adams
(74) *Attorney, Agent, or Firm*—Thomas, Kayden, Horstemeyer & Risley

(57) ABSTRACT

Blu-Ray reading and writing methods are provided. In a reading procedure, a first plurality of recording frames are sequentially read from a Blu-Ray disc and stored in a memory array along a first direction to assemble a first LDC block comprising a plurality of data lines arranged along a second direction. A second plurality of recording frames are simultaneously read and stored in the memory array along the second direction to assemble a second LDC block comprising a plurality of data lines arranged along the first direction while the data lines in the first LDC block are sequentially decoded and output.

10 Claims, 8 Drawing Sheets

READING AND WRITING METHODS AND APPARATUS FOR BLU-RAYS DISCS

BACKGROUND OF THE INVENTION

1. Field of the Invention

The invention relates to Blu-Ray devices, and in particular, to memory utilization methods for accessing Blu-Ray discs.

2. Description of the Related Art

FIG. 1a is a simplified diagram of a conventional Blu-Ray optical device 100. The Blu-Ray optical device 100 comprises a memory array 120. The memory array 120 serves as a data input/output buffer Blu-Ray optical device 100. A disc driver 110 may comprise PUH related control units for accessing a Blu-Ray disc (not shown). Recording frames #R read from the Blu-Ray disc are obtained by the disc driver 110 and stored in the memory array 120, whereas recording frames #W to be written to the Blu-Ray disc are sent to the disc driver 110 from the memory array 120. According to Blu-Ray standard, data stored in the Blu-Ray disc is protected by a complex and robust error correction scheme. The encoder 130 adds the error correction codes to the input data #IN to generate the recording frames #W. Conversely, recording frames #R read from the Blu-Ray disc are decoded by the decoder 140 to ensure frame data integrity. Thus memory array 120 is a critical resource as it processes the majority of the reading, writing, encoding and decoding operations.

FIG. 1b shows an LDC block conforming to the Blu-Ray standard. An LDC block 160 is a physical cluster unit constructed from original data through a complex encoding process. For example, two data frames of 2052 bytes including 2048 data bytes and 4 bytes EDC, are merged to a data sector of 4104 bytes. With RS codes added, the data sector becomes an ECC sector comprising 19 LDS sequences each having 248 bytes. Thereafter, 16 ECC sectors are merged and interleaved to generate an ECC cluster. With a BIS cluster of 3*496 bytes inserted into the ECC cluster, the LDC block 160 as shown in FIG. 1b is constructed. Conventionally, the LDC block 160 is generated line by line in the memory array 120 from the horizontal perspective (viewpoint of the memory array 120). From the vertical perspective (viewpoint of the Blu-Ray disc), the LDC block 160 is formed by 496 recording frames, each having 155 bytes, in which every 31 recording frames refer to a physical sector. When the recording frames are written to a Blu-Ray disc, the disc driver 110 sequentially reads the recording frames in vertical fashion to perform further modulation and write procedures. Generally speaking, due to the nature of Blu-Ray design, the disc driver 110 processes the LDC block 160 in a direction orthogonal to the processing directions of encoder 130 and decoder 140.

FIG. 2a is a flowchart of a conventional reading procedure. To facilitate the description, the mutually orthogonal directions are named as X and Y respectively. In step 202, the recording frames are read from the disc driver 110 line by line along the X direction. In step 204, the reading process is repeated unless a complete LDC block 160 is formed. In step 206, the decoder 140 decodes the LDC block 160 along the Y direction line by line, and the decoded lines can be immediately output to a host (not shown) such as a computer in step 208. Thus steps 206 and 208 are processed simultaneously as in a pipe line. In step 210, the decoding and outputting are recursively processed until all the lines along the Y direction are output, and the procedure returns to step 202 for the next LDC block.

FIG. 2b is a flowchart of a conventional writing procedure. In step 212, input data #IN is input externally to the memory array 120 line by line along the Y direction. In step 214, the encoder 130 recursively encodes the input data #IN in the memory array 120 line by line along the Y direction. In step 216, it is determined if the encoded input data #IN have formed the LDC block 160. If so, step 218 is processed, recursively writing the recording frames of LDC block 160 into the Blu-Ray disc along the X direction. In step 220, the writing procedure is recursively processed until the LDC block 160 is completely written, and the process returns to step 212 for input of another data #IN.

FIGS. 3a and 3b show memory utilization in reference to FIGS. 2a and 2b. FIG. 3a shows the memory array 120 being written line by line along the X direction. If the X direction represents the memory direction, the arrow 302 represents the externally received input data #IN. Conversely, if the X direction represents the disc direction, the arrow 302 represents a recording frame read from the disc. The shadowed area indicates a written part, whereas the rest indicates an empty part. FIG. 3b shows the successive processes. For example, the arrow 304 may represent a line being encoded or decoded, and the arrow 306 represents an output procedure of recording frame #W or output data #OUT. The occupied memory indicated by arrow 306 is released after output; thus, the entire memory array 120 becomes available for the next filling process, such as step 202 in FIG. 2a or step 212 in FIG. 2b, when all the lines are output by arrow 306. Conventionally, the memory array 120 in Blu-Ray optical device 100 is a critical resource comprising limited capacity. The encoding or decoding indicated by arrow 304 may consume considerable time and become a performance bottleneck. Occupied memory becomes available after the arrow 306 is released, and the empty parts remain idle until the entire memory array 120 is available for the next filling process. Since the memory array 120 is a critical resource, increasing the utilization of memory is desirable.

BRIEF SUMMARY OF THE INVENTION

Methods of reading Blu-Ray discs are provided. An exemplary embodiment of a Blu-Ray disc reading method comprises: sequentially reading a first plurality of recording frames from a Blu-Ray disc; storing the first plurality of recording frames in a memory array along a first direction to assemble a first LDC block comprising a plurality of data lines arranged along a second direction, sequentially decoding and outputting the data lines in the first LDC block; simultaneously reading and storing a second plurality of recording frames in the memory array along the second direction to assemble a second LDC block comprising a plurality of data lines arranged along the first direction. The data lines in the second LDC block are decoded and output.

The first direction is orthogonal to the second direction. When a data line of the first LDC block is decoded and output, the memory occupied thereby is released, and a recording frame of the second LDC block is simultaneously read and stored in the released memory location along the second direction.

Methods for writing Blu-Ray discs are provided. An exemplary embodiment of a method for writing Blu-Ray discs comprises: sequentially storing a first plurality of data sequences in a memory array, wherein the first plurality of data sequences are arranged along a first direction. The first plurality of data sequences are encoded line by line to construct a first LDC block comprising a first plurality of recording frames arranged along a second direction. The first plurality of recording frames is sequentially written to a Blu-Ray disc. A second plurality of data sequences is simultaneously stored in the memory array, arranged along the second direction. The second plurality of data sequences are encoded line by line to construct a second LDC block comprising a second plurality of recording frames arranged along the first direction. When the second LDC block is constructed, the second plurality of recording frames are sequentially written to the Blu-Ray disc.

The first direction is orthogonal to the second direction. When a recording frame of the first LDC block is encoded and written to the Blu-Ray disc, the memory occupied thereby is released, and a data sequence of the second LDC block is simultaneously stored in the released memory location along the second direction.

Blu-Ray optical devices implementing the reading and writing methods is also provided. A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
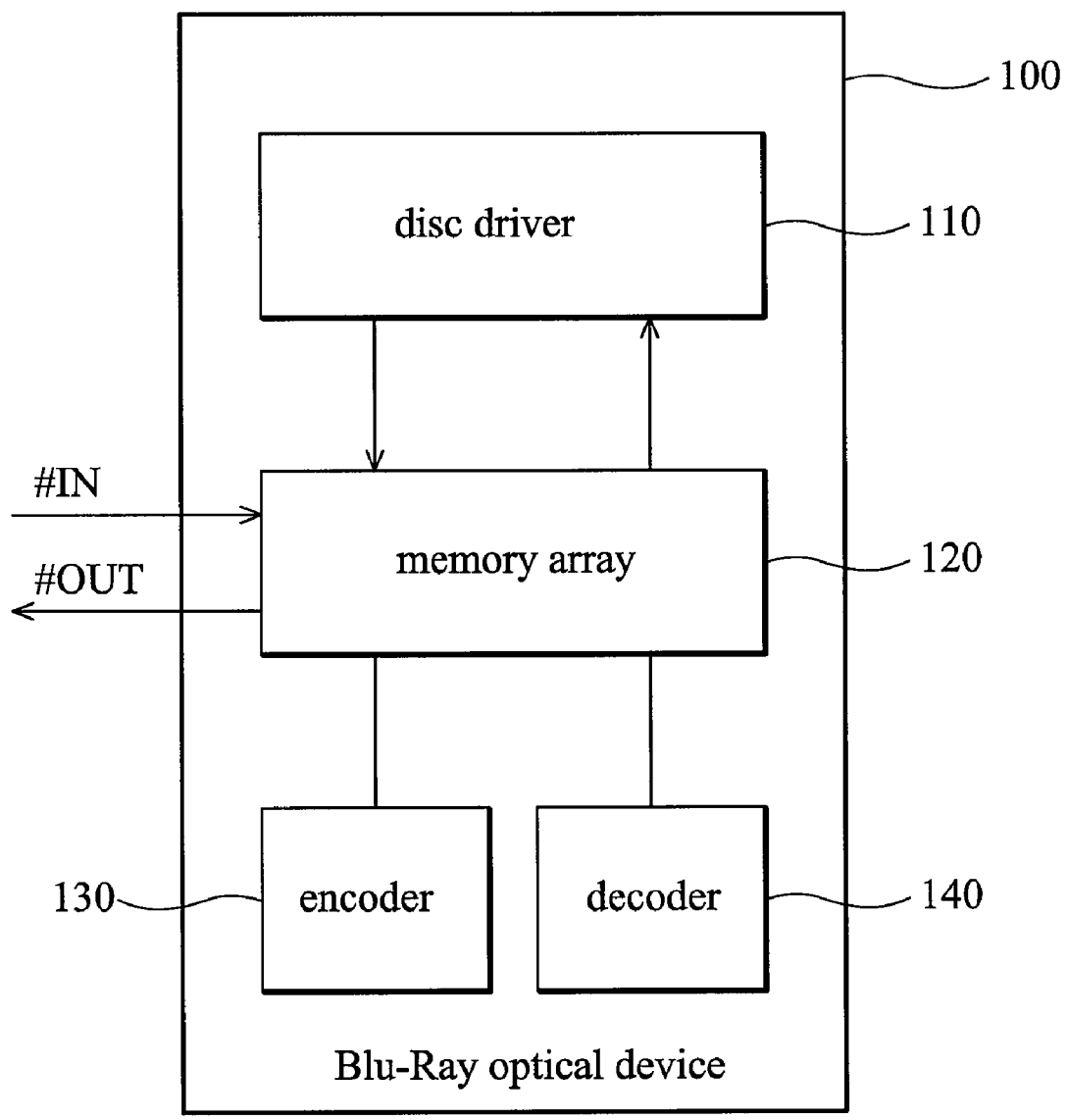
FIG. 1a is a simplified diagram of a conventional Blu-Ray optical device.
Figure 1B:
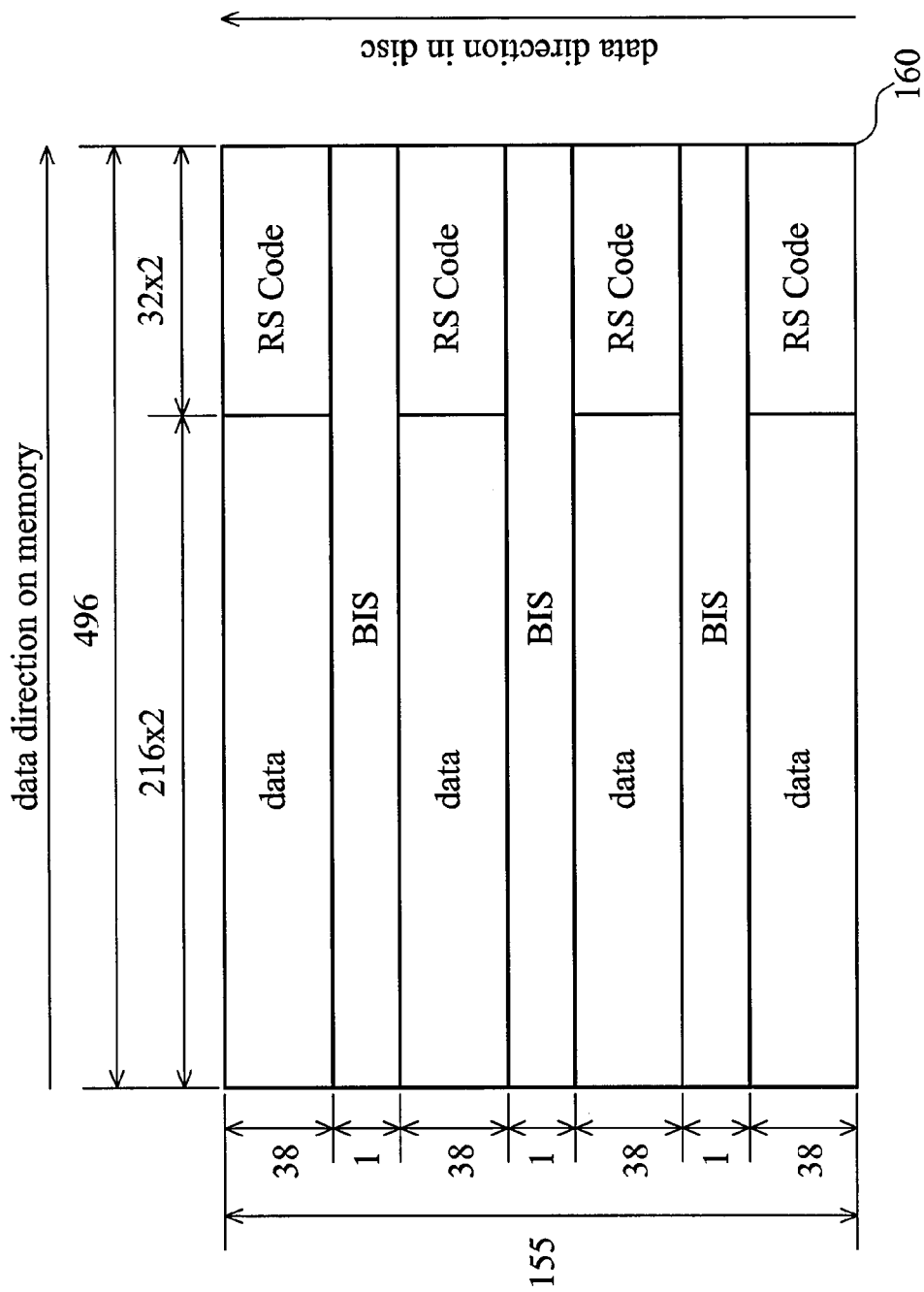
FIG. 1b shows an LDC block according to Blu-Ray standard.
Figure 2A:
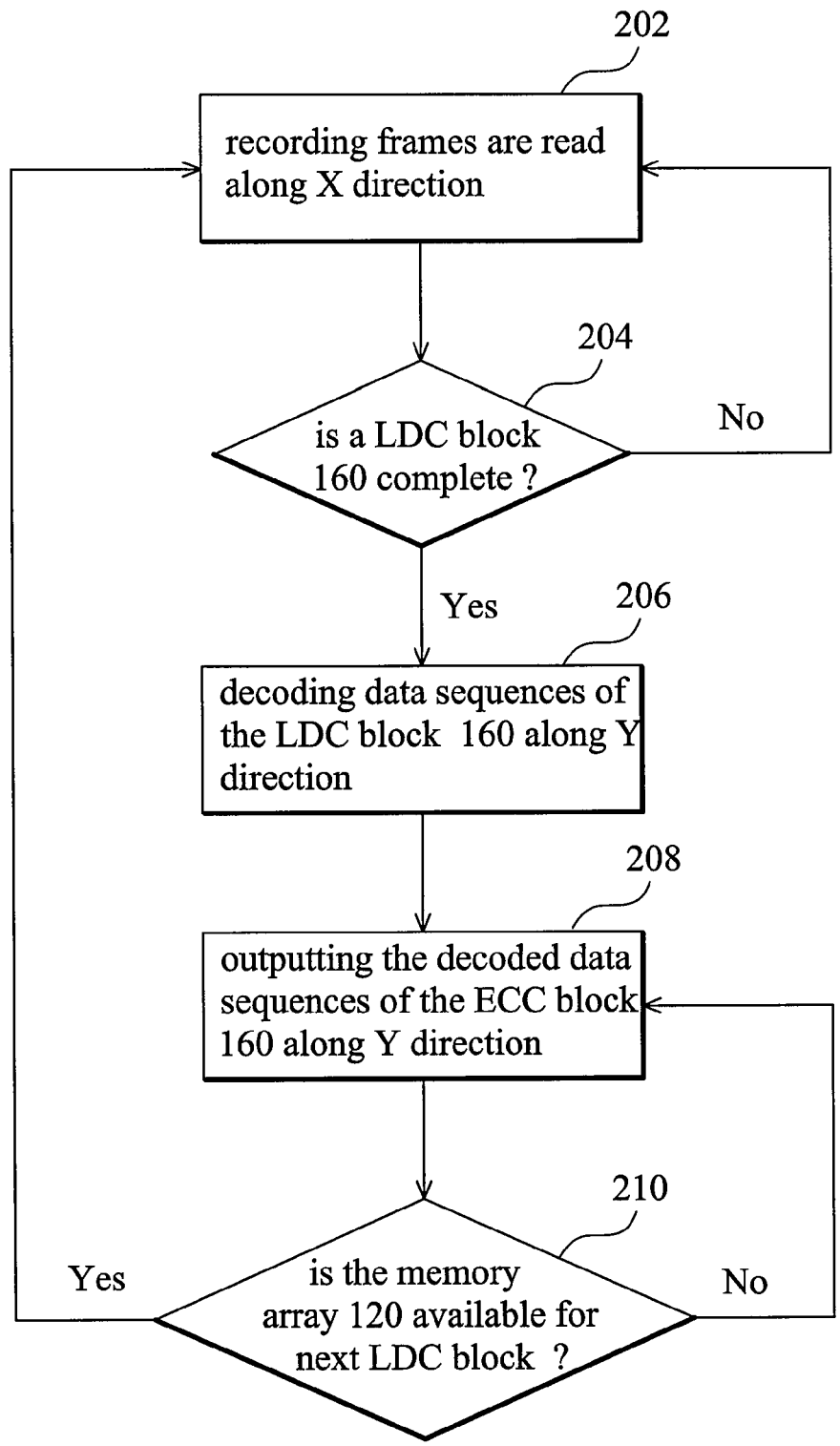
FIG. 2a is a flowchart of a conventional reading procedure.
Figure 2B:
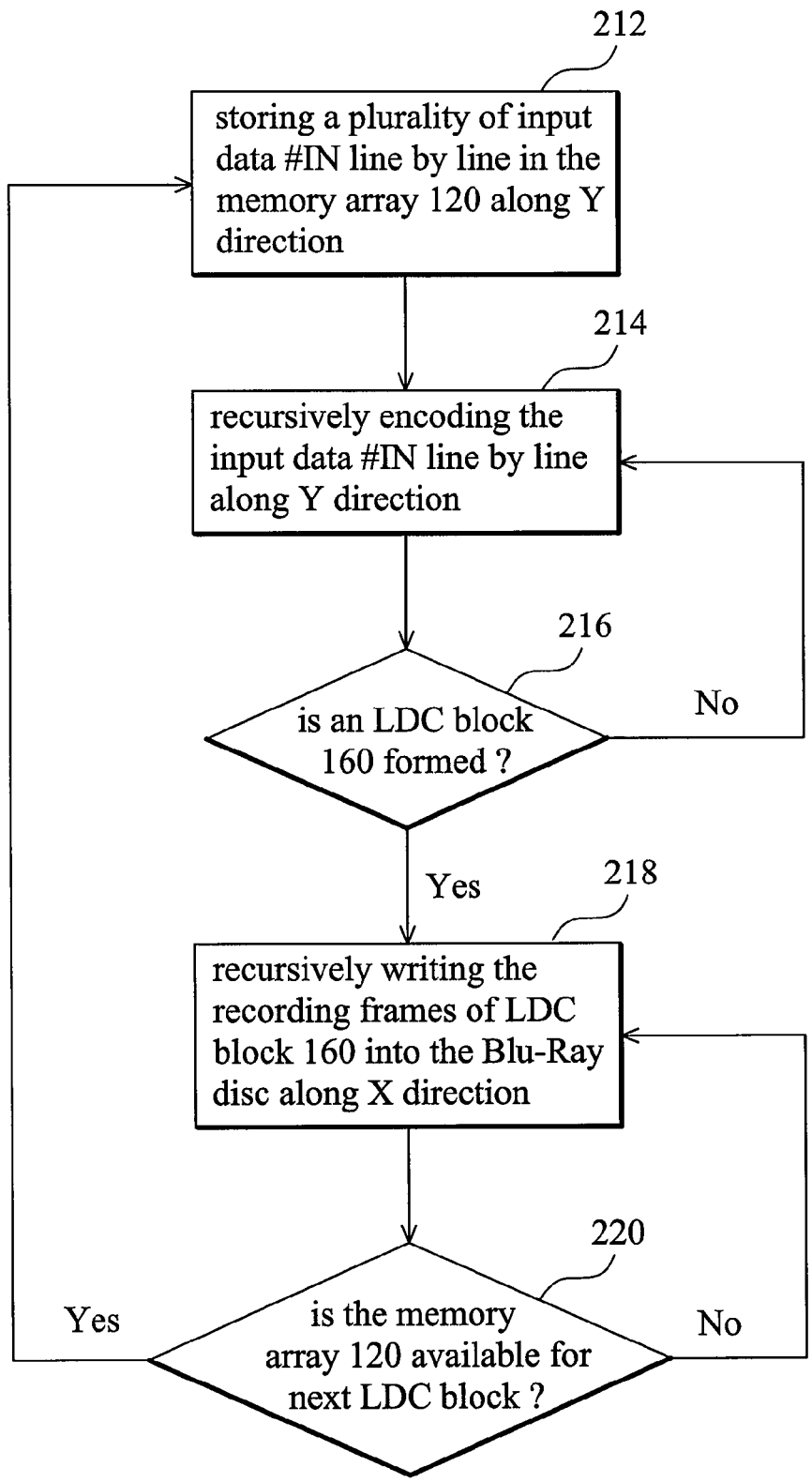
FIG. 2b is a flowchart of a conventional writing procedure.
Figure 3A:
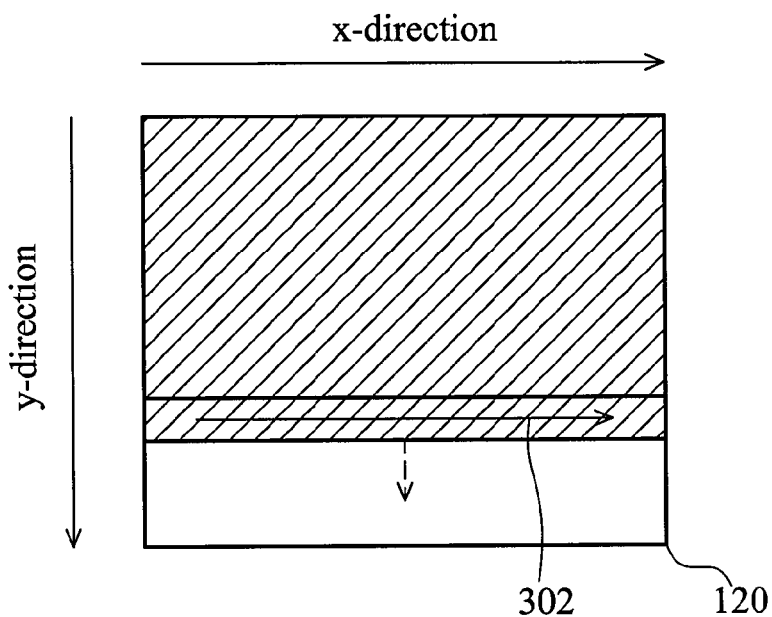
FIGS. 3a and 3b show memory utilizations in reference to FIGS. 2a and 2b.
Figure 3B:
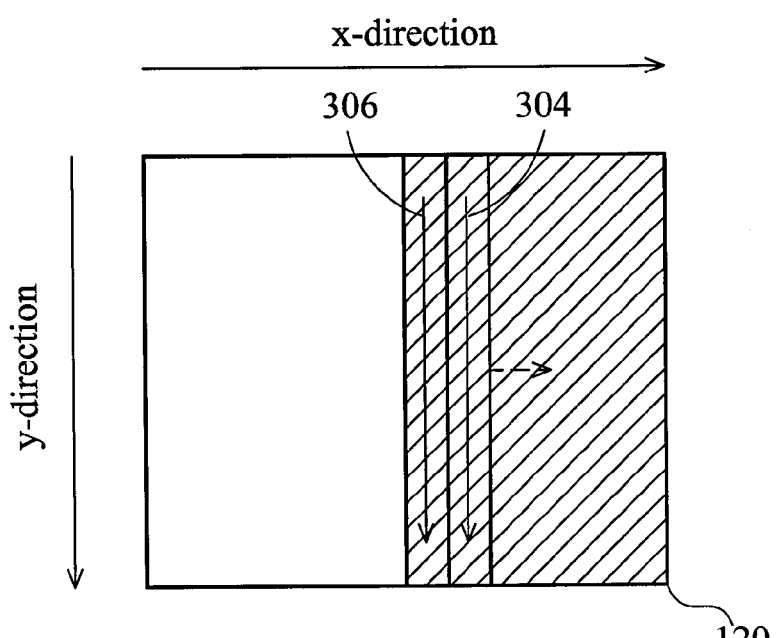

To enhance the memory utilization and reduce the idleness shown in FIG. 3b, the invention provides novel methods of the memory usage.

Figure 4A:
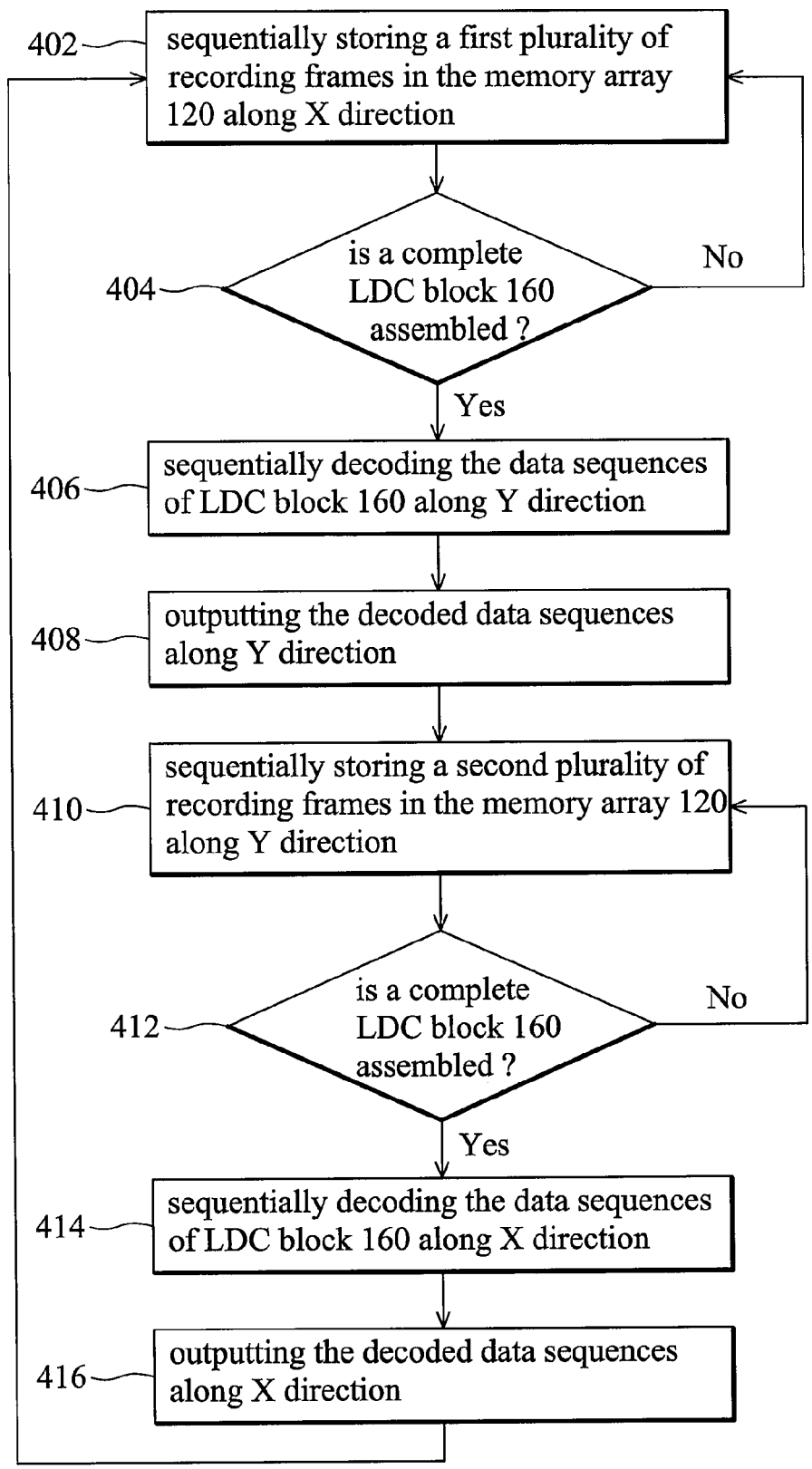
FIG. 4a shows an embodiment of a reading procedure according to the invention.

FIG. 4a shows an embodiment of a reading procedure according to the invention. In step 402, a first plurality of recording frames are sequentially read from the disc driver 110 and stored in the memory array 120 along the X direction. In step 404, the reading process is repeated unless a complete LDC block 160 is formed. The LDC block 160 comprises a plurality of data sequences arranged along the Y direction. In step 406, the decoder 140 sequentially decodes the data sequences of LDC block 160. In step 408, the decoded data sequences are immediately output to a host (not shown) such as a computer. Typically, steps 406 and 408 can be processed simultaneously as a pipe line. When a decoded data sequence is output, the memory occupation thereof is released, generating a line of available space along the Y direction. Steps 410 to 416 are similar to steps 402 to 408; however, the memory storage directions thereof are rotated. In step 410, a second plurality of recording frames is sequentially read from the disc driver 110 and stored in the memory array 120 along the Y direction. Step 410 can thus be immediately processed when the memory occupied in step 408 is released, and the overall disc reading performance can be increased. Similarly, in step 412, the reading of the second plurality of recording frames repeats until another LDC block 160 is formed comprising a plurality of data sequences arranged along the X direction. Thereafter, steps 414 and 416 may be processed simultaneously along the X direction, and the process loops to step 402.

Figure 4B:
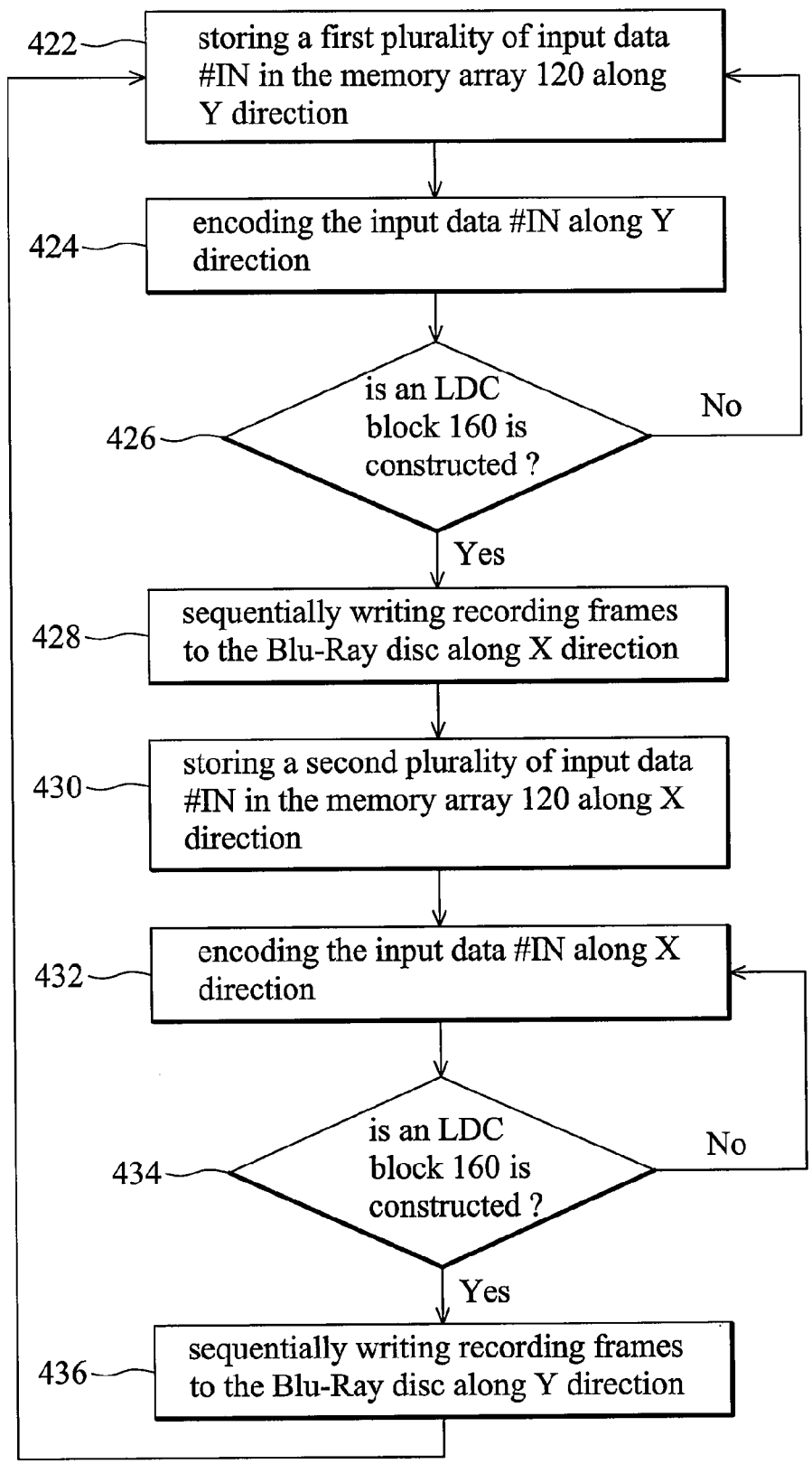
FIG. 4b shows an embodiment of a writing procedure according to the invention.

FIG. 4b shows an embodiment of a writing procedure according to the invention. The same direction rotation concept can be applied to the writing procedure. In step 422, a first plurality of input data #IN are input externally and stored in the memory array 120 along the Y direction. In step 424, the encoder 130 encodes the input data #IN as soon as they are input, and the encoded data sequences continue to be stored in the same location. In step 426, step 424 is recursively processed until an LDC block 160 is constructed, comprising a plurality of recording frames arranged along the X direction. Thereafter, in step 428, recording frames in the LDC block 160 are sequentially written into the Blu-Ray disc. When a recording frame is written, the memory occupied thereby is released becoming available space lying along the X direction. Steps 430 to 436 are symmetric to steps 422 to 428, however, the processing direction thereof is rotated. In step 430, a second plurality of input data #IN are input externally and stored in the memory array 120 along the X direction. Step 430 can be performed simultaneously with step 428 to make use of the X direction spaces as soon as they are available. Thus, the period of time the memory array 120 is idle can be reduced optimizing utilization. In step 432, the input data #IN are encoded along the X direction. In step 434, another LDC block 160 is constructed until all the input data #IN is encoded, in which a plurality of recording frames are arranged along the Y direction. Thereafter, in step 436, the recording frames in the LDC block 160 are sequentially written into the Blu-Ray disc, and the process loops to step 422.

Figure 5:
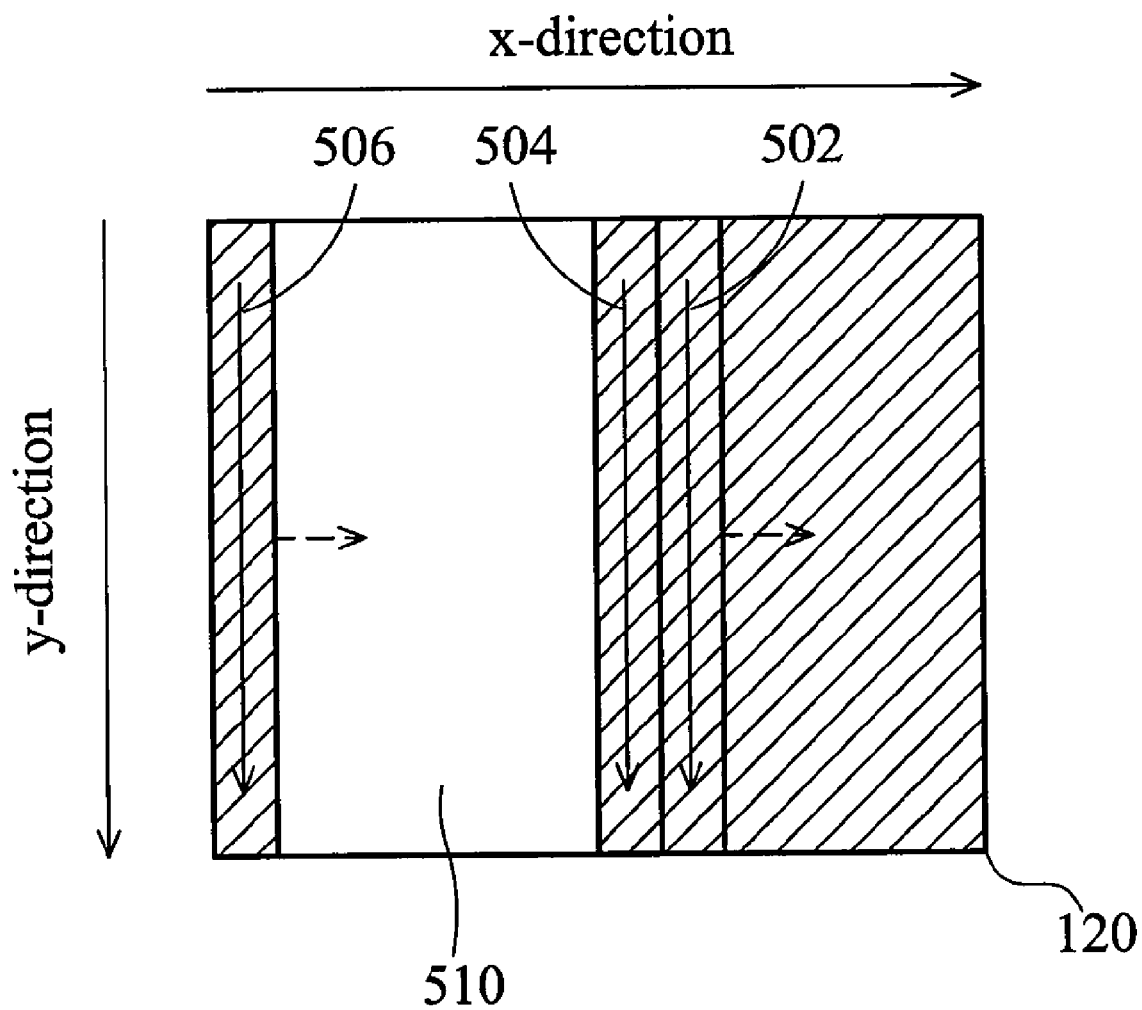
FIG. 5 shows the memory utilization according to the invention.

FIG. 5 shows the memory utilization according to the invention. The arrow 502 may represent step 406 in FIG. 4a, and the arrow 504 step 408. Arrow 502 can be processed immediately as soon as a line of Y direction memory space is released from the arrow 504, thus the space 510 may be minimized. The memory array 120 can thus be fully used with minimum idle time. Another issue may be concerned. The LDC block 160 is a 496×155 rectangle, and the memory array maybe a 496×496 square to fit the LDC block in both directions. However, the memory array may not need to be a square. In this case, when data storage along a direction exceeds the width/length of the memory array, a next line is automatically switched for use.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A Blu-Ray reading method, comprising:
sequentially reading a first plurality of recording frames from a Blu-Ray disc to a memory array along a first direction;
processing the first plurality of recording frames along a second direction;
sequentially releasing a capacity of the memory array along the second direction; and while the capacity of the memory array is sequentially released, sequentially reading a second plurality of recording frames from the Blu-Ray disc to the memory array along the second direction.

2. The Blu-Ray reading method as claimed in claim 1, wherein:
the first plurality of recording frames stored in the memory array reorganize a first LDC block comprising a plurality of data lines arranged along the second direction;
the processing step comprises sequentially decoding the data lines in the first LDC block and outputting the decoded data thereof, such that capacity occupied thereby are sequentially released along the second direction.

3. The Blu-Ray reading method as claimed in claim 2, wherein:
the first direction is orthogonal to the second direction; and
when a data line of the first LDC block is decoded and output, the memory occupied thereby is released, and a recording frame of the second LDC block is simultaneously read and stored to the released memory location along the second direction.

4. A Blu-Ray writing method, comprising:
sequentially storing a first plurality of data sequences in a memory array along a first direction;
processing the first plurality of data sequences to form a first plurality of recording frames arranged along a second direction;
sequentially writing the first plurality of recording frames to a Blu-Ray disc, such that memory capacities occupied thereby are released; and
while the memory capacities occupied by the recording frames are released, sequentially storing a second plurality of data sequences in the memory array along the second direction.

5. The Blu-Ray writing method as claimed in claim 4, wherein the processing step comprises encoding the first plurality of data sequences line by line to construct a first LDC block comprising the first plurality of recording frames arranged along the second direction.

6. The Blu-Ray writing method as claimed in claim 5, wherein:
the first direction is orthogonal to the second direction; and
when a recording frame of the first LDC block is encoded and written to the Blu-Ray disc, the memory occupied thereby is released, and the storing of a data sequence of the second LDC block is simultaneously processed on the released memory location along the second direction.

7. A Blu-Ray optical device, comprising:
a disc driver for accessing a Blu-Ray disc;
a decoder, decoding an LDC block read from the Blu-Ray disc and performing an error correction thereof;
a memory array, serving as a buffer for access of the Blu-Ray disc; wherein:
the disc driver sequentially reads a first plurality of recording frames from the Blu-Ray disc;
the disc driver stores the first plurality of recording frames in the memory array along a first direction to assemble a first LDC block comprising a plurality of data lines arranged along a second direction;
the decoder sequentially decodes the data lines in the first LDC block and outputs the decoded data thereof;
the disc driver sequentially reads a second plurality of recording frames from the Blu-Ray disc;
the disc driver stores the second plurality of recording frames in the memory array along the second direction to assemble a second LDC block comprising a plurality of data lines arranged along the first direction; and
the decoder sequentially decodes the data lines in the second LDC block and outputs the decoded data thereof.

8. The Blu-Ray optical device as claimed in claim 7, wherein:
the first direction is orthogonal to the second direction; and
when a data line of the first LDC block are decoded and output, the memory occupied thereby is released, and the disc driver simultaneously reads a recording frame of the second LDC block to the released memory location.

9. The Blu-Ray optical device as claimed in claim 7, further comprising a encoder encoding and adding error correction codes to an input data before writing to the Blu-Ray disc; wherein:
a first plurality of data sequences are sequentially input and stored in the memory array, wherein the first plurality of data sequences are arranged along a first direction;
the encoder encodes the first plurality of data sequences line by line to construct a first LDC block comprising a first plurality of recording frames arranged along a second direction;
the disc driver sequentially writes the first plurality of recording frames to a Blu-Ray disc;
a second plurality of data sequences are sequentially input and stored in the memory array, wherein the second plurality of data sequences are arranged along the second direction;
the encoder encodes the second plurality of data sequences line by line to construct a second LDC block comprising a second plurality of recording frames arranged along the first direction; and
the disc driver sequentially writes the second plurality of recording frames to the Blu-Ray disc.

10. The Blu-Ray optical device as claimed in claim 9, wherein:
the first direction is orthogonal to the second direction; and
when a recording frame of the first LDC block is encoded and written to the Blu-Ray disc, the memory occupied thereby is released, and the storing of a data sequence of the second LDC block is simultaneously processed on the released memory location along the second direction.

* * * * *